(12) United States Patent
Grayson et al.

(10) Patent No.: US 9,198,209 B2
(45) Date of Patent: Nov. 24, 2015

(54) PROVIDING INTEGRATED END-TO-END ARCHITECTURE THAT INCLUDES QUALITY OF SERVICE TRANSPORT FOR TUNNELED TRAFFIC

(75) Inventors: Mark Grayson, Maidenhead (GB); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 599 days.

(21) Appl. No.: 13/591,069

(22) Filed: Aug. 21, 2012

(65) Prior Publication Data
US 2014/0056130 A1 Feb. 27, 2014

(51) Int. Cl.
*G01R 31/08* (2006.01)
*H04W 76/02* (2009.01)
*H04W 28/02* (2009.01)

(52) U.S. Cl.
CPC ........ *H04W 76/022* (2013.01); *H04W 28/0268* (2013.01)

(58) Field of Classification Search
CPC .......... H04W 77/022; H04W 28/0268; H04W 76/022
See application file for complete search history.

(56) References Cited

U.S. PATENT DOCUMENTS

| | | | |
|---|---|---|---|
| 6,519,254 B1 * | 2/2003 | Chuah et al. | 370/389 |
| 6,822,940 B1 | 11/2004 | Zavalkovsky et al. | |
| 6,889,050 B1 | 5/2005 | Willars et al. | |
| 7,215,667 B1 | 5/2007 | Davis | |
| 8,000,242 B2 | 8/2011 | Wang et al. | |
| 8,254,382 B1 | 8/2012 | Wu et al. | |
| 8,355,413 B2 | 1/2013 | Vasamsetti et al. | |
| 8,358,593 B2 | 1/2013 | Eipe et al. | |
| 8,391,152 B2 | 3/2013 | Briscoe et al. | |
| 8,493,860 B2 | 7/2013 | Racz et al. | |
| 8,599,865 B2 * | 12/2013 | Venkataswami et al. | 370/401 |
| 2003/0058862 A1 | 3/2003 | Lansing et al. | |
| 2003/0103458 A1 | 6/2003 | Shin | |
| 2004/0052212 A1 | 3/2004 | Baillargeon | |
| 2004/0114519 A1 | 6/2004 | MacIsaac | |
| 2005/0041584 A1 | 2/2005 | Lau et al. | |
| 2005/0138418 A1 | 6/2005 | Spry et al. | |
| 2005/0159167 A1 | 7/2005 | Hakalin et al. | |
| 2006/0159016 A1 | 7/2006 | Sagfors et al. | |
| 2006/0183479 A1 * | 8/2006 | Liu et al. | 455/436 |
| 2007/0064684 A1 | 3/2007 | Kottilingal | |
| 2007/0105549 A1 | 5/2007 | Suda et al. | |
| 2007/0189268 A1 | 8/2007 | Mitra et al. | |
| 2008/0008093 A1 | 1/2008 | Wang et al. | |
| 2008/0049787 A1 | 2/2008 | McNaughton et al. | |

(Continued)

OTHER PUBLICATIONS

Etsi, "LTE; General Packet Radio Service (GPRS) enhancements for Evolved Universal Terrestrial Radio Access Network (E-UTRAN) access (3GPP TS 23.401 version 9.6.0 Release 9)," © European Telecommunications Standards Institute 2010; 262 pages.

(Continued)

*Primary Examiner* — Robert Wilson
(74) *Attorney, Agent, or Firm* — Patent Capital Group (57) ABSTRACT

A method is provided in one example embodiment and includes receiving a request associated with a flow over a wireless link, where the request specifies resource requirements for the flow. The method also includes mapping an Internet protocol (IP) flow description to a plurality of tunnel IP addresses, and mapping a framed IP address to an access point (AP) tunnel endpoint address in order to establish a quality of service (QoS) for tunneled traffic.

21 Claims, 5 Drawing Sheets

(56) References Cited

U.S. PATENT DOCUMENTS

| | | | |
|---|---|---|---|
| 2008/0144496 | A1 | 6/2008 | Bachmutsky |
| 2008/0144502 | A1 | 6/2008 | Jackowski et al. |
| 2008/0201772 | A1 | 8/2008 | Mondaeev et al. |
| 2009/0005051 | A1 | 1/2009 | Voyer et al. |
| 2009/0109922 | A1 | 4/2009 | Livanos |
| 2009/0122727 | A1 | 5/2009 | Gan et al. |
| 2009/0156213 | A1* | 6/2009 | Spinelli et al. ............... 455/436 |
| 2009/0268684 | A1 | 10/2009 | Lott et al. |
| 2009/0296599 | A1 | 12/2009 | Ayyagari et al. |
| 2010/0002722 | A1 | 1/2010 | Porat et al. |
| 2010/0246432 | A1 | 9/2010 | Zhang et al. |
| 2010/0255841 | A1 | 10/2010 | Kubo et al. |
| 2010/0322141 | A1 | 12/2010 | Liu et al. |
| 2011/0026453 | A1 | 2/2011 | Yan |
| 2011/0098031 | A1 | 4/2011 | Dakshayani et al. |
| 2011/0098051 | A1 | 4/2011 | Kamalaraj et al. |
| 2011/0110286 | A1 | 5/2011 | Lu et al. |
| 2011/0111767 | A1 | 5/2011 | Livanos |
| 2011/0117931 | A1 | 5/2011 | Hu et al. |
| 2011/0141884 | A1 | 6/2011 | Olsson et al. |
| 2011/0153844 | A1 | 6/2011 | Bovo et al. |
| 2011/0164111 | A1 | 7/2011 | Karaoguz et al. |
| 2011/0235528 | A1 | 9/2011 | Racz et al. |
| 2011/0292870 | A1 | 12/2011 | Nagpal et al. |
| 2012/0023234 | A1* | 1/2012 | Martin ......................... 709/226 |
| 2012/0026884 | A1 | 2/2012 | Sundell et al. |
| 2012/0047273 | A1 | 2/2012 | Ajero et al. |
| 2012/0113894 | A1 | 5/2012 | Yang et al. |
| 2012/0201137 | A1 | 8/2012 | Le Faucheur |
| 2012/0207013 | A1 | 8/2012 | Kamalaraj |
| 2012/0207022 | A1 | 8/2012 | Grayson |
| 2012/0269064 | A1 | 10/2012 | Strasman |
| 2012/0287784 | A1* | 11/2012 | Shatzkamer et al. ...... 370/230.1 |
| 2013/0010686 | A1 | 1/2013 | Shatzkamer et al. |
| 2013/0103833 | A1 | 4/2013 | Ringland et al. |
| 2014/0056130 | A1* | 2/2014 | Grayson et al. ............... 370/230 |

OTHER PUBLICATIONS

O'Dell, Mike, "8+8 —An Alternate Addressing Architecture for IPv6," Network Working Group Internet Draft <draft-odell-8+8-00. txt> UUNET Technologies, Oct. 22, 1996, 21 pages.

Subharthi, Paul, et al., "A Vision of the Next Generation Internet: A Policy Oriented Perspective," Proceedings of British Computer Society (BCS) International Conference on Visions of Computer Science, Imperial College, Long, Sep. 22-24, 2008, 12 pages.

Zorn, G., et al., "Radius Attributes for Tunnel Protocol Support," Network Working Group RFC 2868, Jun. 2000, 21 pages.

"Data-over-Cable Service Interface Specifications DOCSIS 3.0; MAC and Upper Layer Protocols Interface Specification," Feb. 15, 2008.

USPTO Jan. 24, 2013 Non-Final Office Action from U.S. Appl. No. 13/104,788.

P. Eardley, "Pre-Congestion Notification (PCN) Architecture," Network Working Group, RFC 5559, Jun. 2009, 51 pages; http://eprints.eemcs.utwente.nl/15444/01/rfc5559.txt.

Francois Le Faucheur, et al., "RSVP Extensions for Admission Control Over Diffserv Using Pre-Congestion Notification (PCN)," Internet Draft, © The Internet Society (2006), 11 pages; http://tools.ietf.org/pdf/draft-lefaucheur-rsvp-ecn-01.pdf.

Wayne Cutler, "MSF Whitepaper on Quality of Service (QoS) over the Network-to-Network Interface (NNI)—MSF-TR-Services-006. FINAL," MultiService Forum © 2010, 22 pages.

U.S. Appl. No. 14/058,732, filed Oct. 21, 2013, entitled "System and Method for Managing Tracking Area Identity Lists in a Mobile Network Environment," Inventors: Vinod K. Kamalaraj, et al.

USPTO Oct. 9, 2013 Request for Continued Examination Response to Jul. 16, 2013 Final Office Action from U.S. Application U.S. Appl. No. 13/027,970.

USPTO Oct. 31, 2013 Non-Final Office Action from U.S. Appl. No. 13/027,970.

USPTO Sep. 10, 2013 Notice of Allowance from U.S. Appl. No. 13/027,999.

USPTO Aug. 13, 2013 Response to Jun. 18, 2013 Non-Final Office Action from U.S. Appl. No. 13/021,125.

USPTO Oct. 24, 2013 Final Office Action from U.S. Appl. No. 13/021,125.

USPTO Oct. 16, 2013 Response to Jul. 26, 2013 Non-Final Office Action from U.S. Appl. No. 13/179,537.

U.S. Appl. No. 14/159,508, filed Jan. 21, 2014, entitled "System and Method for Managing Congestion in a Network Environment," Inventors: Francois L. Le Faucheur, et al.

USPTO Jan. 6, 2014 Notice of Allowance from U.S. Appl. No. 13/021,125.

USPTO Mar. 7, 2013 Non-Final Office Action from U.S. Appl. No. 13/027,970.

USPTO Apr. 16, 2013 Response to Non-Final Office Action dated Jan. 24, 2013 from U.S. Appl. No. 13/104,788.

USPTO Apr. 8, 2014 Final Office Action from U.S. Appl. No. 13/027,970.

USPTO Feb. 3, 2014 Non-Final Office Action from U.S. Appl. No. 13/179,537.

Kent, et al., "Security Architecture for the Internet Protocol," Network Working Group, IETF RFC 2401; Nov. 1998.

USPTO Jun. 7, 2013 Response to Mar. 7, 2013 Non-Final Office Action from U.S. Appl. No. 13/027,970.

USPTO Jul. 16, 2013 Final Office Action from U.S. Appl. No. 13/027,970.

USPTO Jul. 2, 2013 Non-Final Office Action from U.S. Appl. No. 13/027,999.

USPTO Aug. 2, 2013 Response to Jul. 2, 2013 Non-Final Office Action from U.S. Appl. No. 13/027,999.

USPTO Jun. 7, 2013 Final Office Action from U.S. Appl. No. 13/104,788.

USPTO Jun. 18, 2013 Non-Final Office Action from U.S. Appl. No. 13/021,125.

USPTO Jul. 26, 2013 Non-Final Office Action from U.S. Appl. No. 13/179,537.

USPTO Jul. 23, 2014 Notice of Allowance from U.S. Appl. No. 13/027,970.

USPTO Jan. 27, 2015 Non-Final Office Action from U.S. Appl. No. 14/058,732.

USPTO May 9, 2014 Non-Final Office Action from U.S. Appl. No. 13/104,788.

USPTO Oct. 28, 2014 Final Office Action from U.S. Appl. No. 13/104,788.

USPTO May 13, 2015 Non-Final Office Action from U.S. Appl. No. 14/058,732.

USPTO Jul. 2, 2015 Non-Final Office Action from U.S. Appl. No. 13/104,788.

USPTO Aug. 21, 2015 Notice of Allowance from U.S. Appl. No. 14/058,732.

* cited by examiner

PROVIDING INTEGRATED END-TO-END ARCHITECTURE THAT INCLUDES QUALITY OF SERVICE TRANSPORT FOR TUNNELED TRAFFIC

TECHNICAL FIELD

This disclosure relates in general to the field of communications, and more particularly, to providing an integrated end-to-end architecture that includes quality of service transport for tunneled traffic.

BACKGROUND

Networking architectures have grown increasingly complex in communications environments: particularly mobile wireless environments. Cable operators are also steadily increasing their wireless service offerings, including 3G, WiFi, WiMAX, picocells, and femtocells, which can be linked to backhaul networks using the Data over Cable Service Interface Specification (DOCSIS). In such deployments, the radio technology is designed to provide quality of service (QoS) for services like voice, video, and specific per-subscriber service tiers. However, current delivery mechanisms have their limitations. As future applications drive increased bandwidth, current architectures may not be able to ensure that the QoS designations can be met. Hence, significant challenges remain for managing network resources, particularly in the context of wireless networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a request associated with a flow over a wireless link, where the request specifies resource requirements for the flow. The method also includes mapping an Internet protocol (IP) flow description to a plurality of tunnel IP addresses, and mapping a framed IP address to an access point (AP) tunnel endpoint address in order to establish a quality of service (QoS) for tunneled traffic.

In more specific examples, the method can include recovering asynchronous signaling of updated transport IP addresses as a result of at least one mobility event. The method can also include reconfiguring a message received from an application function in order to provide a mapping to the tunnel IP addresses. The message can include media component descriptions and uplink/downlink bandwidth data.

The wireless link can be coupled to a Data over Cable Service Interface Specification (DOCSIS) link associated with a cable modem and a cable modem termination system (CMTS). In addition, Packet Cable Multimedia (PCMM) interfaces can be used to establish the QoS for a DOCSIS IP transport network. In certain implementations, remote authentication dial in user service (RADIUS) protocol interim messages are used for signaling the tunnel IP addresses. The present disclosure is applicable to various access architectures/transport networks such as, for example, a control and provisioning of wireless access points (CAPWAP) network, a DOCSIS network, and a Telecoms & Internet converged Services & Protocols for Advanced Networks (TISPAN) network with corresponding RACS policy signaling.

The method can also include signaling an access network for previously allocated resources to be released, and signaling the access network for newly allocated transport resources to be reserved for tunneled transport. The tunnel IP addresses can be associated with a CAPWAP tunnel between a Wi-Fi access point (AP) and a wireless local area network controller (WLC). Alternatively, the tunnel IP addresses can be associated with a GPRS Tunneling Protocol (GTP) tunnel between a service gateway (SGW) and a packet data network (PDN) gateways (PGW). In other examples, the tunnel IP addresses are associated with a GPRS Tunneling Protocol (GTP) tunnel between an eNode B (eNodeB) and a service gateway (SGW).

A layer-1 point of attachment (PoA) with an access network is changed as a result of at least one mobility event. Additionally, the method can include providing an asynchronous indication to a previous querying element that at least one of the tunnel IP addresses have changed as a result of the at least one mobility event.

Example Embodiments

Figure 1:
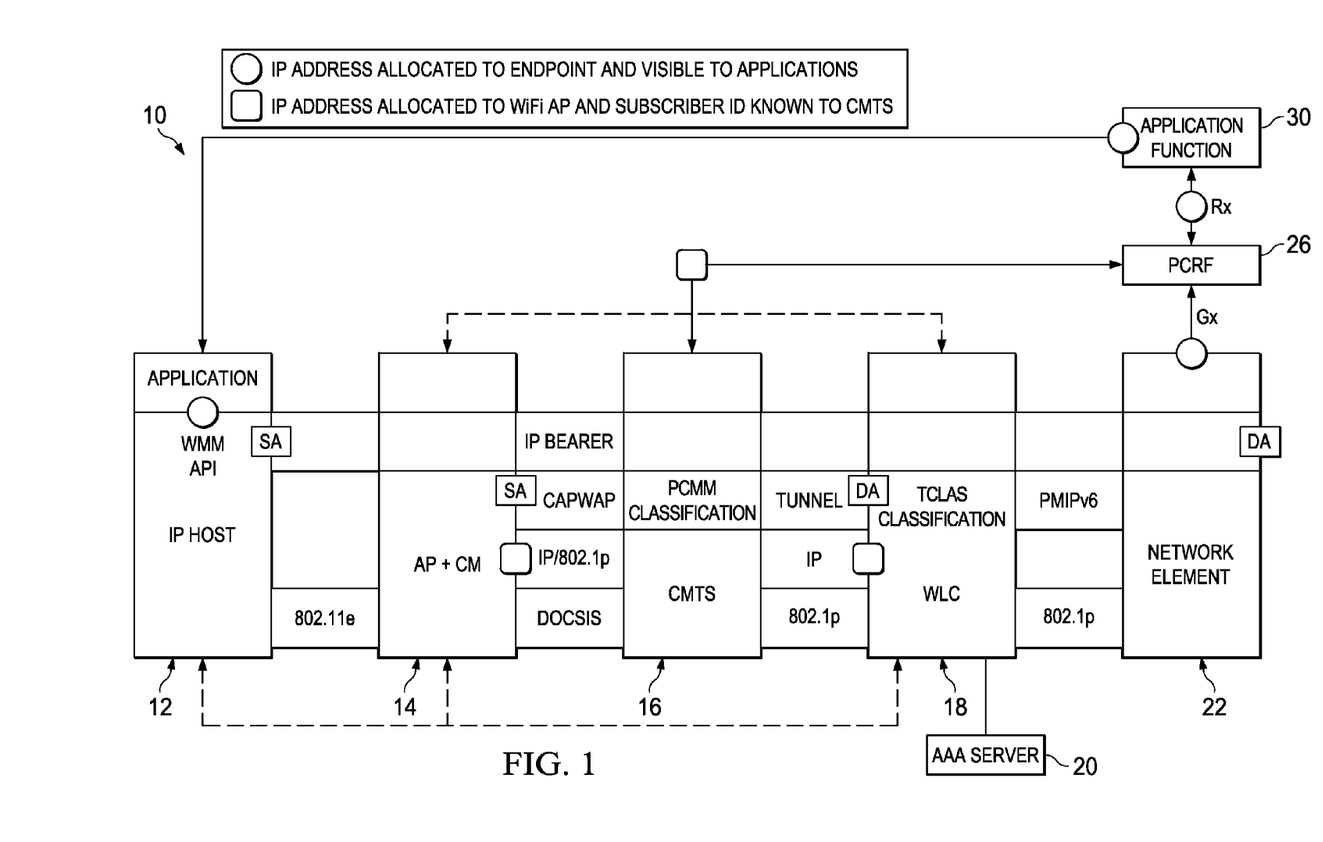
FIG. 1 is a simplified block diagram illustrating a communication system for providing an integrated end-to-end architecture in accordance with one embodiment of the present disclosure.

Turning to FIG. 1, FIG. 1 is a simplified block diagram of an example embodiment of a communication system 10 for providing integrated an end-to-end (E2E) architecture that includes transport quality of service (QoS) for tunneled traffic. This particular configuration may be tied to the 3rd Generation Partnership Project (3GPP) Evolved Packet System (EPS) architecture, also sometimes referred to as the Long-Term Evolution (LTE) EPS architecture, but alternatively this depicted architecture may be equally applicable to other environments. The example architecture of FIG. 1 includes an Internet protocol (IP) host 12, an access point (AP)+cable modem (CM) 14, a cable modem termination system (CMTS) 16, a wireless local area network controller (WLC) 18, a network element 22, and an authentication, authorization, and accounting (AAA) server 20. In this particular configuration of FIG. 1, IP host 12 includes an application and an element associated with a Wi-Fi Multimedia (WMM) application program interface (API).

In addition, FIG. 1 includes an application function (AF) 30, which is coupled to a policy and charging rules function (PCRF) 26. Note that the example infrastructure of FIG. 1 is not exhaustive, as it represents a simplified framework for discussing the teachings of the present disclosure. For example, any type of user equipment (UE) could be coupled to IP host 12. Also, any number of packet data network (PDN) gateways (PGWs) could be provisioned in the system, along with logical connections to serving gateways (SGWs).

FIG. 1 also illustrates source address (SA) and destination address (DA) identifiers, IP bearers, Traffic Classification (TCLAS) identifiers, Packet Cable Multimedia (PCMM) classifications, etc. Also depicted in FIG. 1 are various types of interfaces (e.g., Rx, Gx, 802.11e, 802.1p, etc.). Note also that the circles shown in FIG. 1 are designating an IP address being allocated to an endpoint and being visible to applications. The square is designating an IP address being allocated to a WiFi access point (AP), where the subscriber ID is known to CMTS 16.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Also provided in the architecture of FIG. 1 is a series of interfaces, which can offer mobility, policy control, AAA functions, and charging activities for various network elements. For example, interfaces can be used to exchange point of attachment, location, and access data for one or more end users. Resource, accounting, location, access network information, network address translation (NAT) control, etc. can be exchanged using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

Before detailing the operations and the infrastructure of FIG. 1, certain contextual information is provided to offer an overview of some problems that may be encountered while providing QoS in a wireless network environment. Such information is offered earnestly and for teaching purposes only and, therefore, should not be construed in any way to limit the broad applications of the present disclosure.

Wireless systems typically make use of IP tunnels to provide service to attached users. Using tunnels, a centralized IP point of attachment (PoA) can be used that masks mobility from correspondent nodes connected to the Internet. Example tunnels that are commonly used in mobility architecture may be associated with the GPRS Tunneling Protocol (GTP), Proxy Mobile IPv6 (PMIPv6), and CDMA2000 A8 and A10 interfaces. Tunneled wireless interfaces can be transported over IP networks. In some instances, those IP networks have been enhanced with differentiated QoS capabilities. As an example, Data over Cable Service Interface Specification (DOCSIS) access networks have been enhanced with Service Flow capabilities together with Packet Cable Multi Media components to allow QoS to be applied to real-time IP flows.

DOCSIS is an international telecommunications standard, which permits the addition of high-speed data transfer to an existing cable TV (CATV) system. DOCSIS may be deployed by operators to provide Internet access over, for example, hybrid fiber-coaxial (HFC) infrastructure. Typically, a DOCSIS architecture includes two primary components: a cable modem (CM) located at the customer premises and a CMTS located at the headend. Cable systems supporting on-demand programming can use a hybrid fiber-coaxial system. Fiber optic lines can bring digital signals to nodes in the system, where they can be converted into RF channels and modem signals on coaxial trunk lines. A typical CMTS is a device that hosts downstream and upstream ports.

Base stations are configured to carry traffic for which certain data rate levels are ensured. Additionally, there are certain classes of service within the traffic such that network characteristics (e.g., latency and jitter) can be accommodated by an architecture. The base station typically administers higher rates of service over the air (e.g., over a cellular interface). The backhaul is generally controlled by the cable modem and the CMTS.

Operationally, in a typical wireless deployment, the radio technology (WiFi, WiMAX, 3G, etc.) would be designed to provide QoS for services like voice, video, or specific per-subscriber service tiers. However, the standardization of such systems does not address QoS issues. Rather, QoS requirements (and delivery mechanisms) are generally restricted to the air interface with no connections or tie-ins to layer-2 specific QoS capabilities (and delivery mechanisms) over the DOCSIS link. Hence, providing guaranteed service over such systems remains challenging.

Moreover, in cases where a service provider seeks to provide an end-to-end service, where both the wireless link and the cable link should be provisioned appropriately, there is no mechanism to accomplish this objective. Stated in different terminology, LTE, WiMAX, 3GPP define a signaling mechanism for quality of service at the air interface (i.e., between the base station and the mobile device), but these architectures fail to provide for any interworking of such mechanisms over the links.

The enhancements to conventional IP transport networks typically include a packet classifier for identifying flows that need to receive differentiated QoS treatment. In parallel, mobile network architectures have been enhanced with differentiated quality of service support. In most architectures, the IP point of attachment function has been enhanced with the policy and charging enforcement functionality (PCEF). This PCEF is typically coupled to a policy and charging rules function, to allow external application functions to request differentiated QoS handling on behalf of an IP host. Certain solutions for addressing QoS issues have centered on the cable modem: specifically, defining new interfaces between the base station and e-Node B, and using a QoS pull model from the CM.

In essence, there should be a mapping between IP addresses. The architecture should be able to receive a request for policy to be applied for a UE IP address and map it to the AP IP address. Similar procedures can be applied for control and provisioning of wireless access points (CAPWAP) and PMIPv6. Ideally, there should be some capability for accommodating mobility, where an AP IP address would change in mid-flow. In addition, the framework should be able to trigger a dynamic service delete message for an old AP (and, possibly, an old WLC) and a dynamic service add for the new AP (and, possibly, the new WLC). The architecture should also be able to define how the WLC and/or the PGW expose tunnel endpoint IP addresses.

In accordance with one example embodiment, communication system 10 can overcome some of the aforementioned shortcomings (and others) in defining an architecture for effectively coordinating quality of service in a wireless environment. This can include the transport of tunneled interfaces across an IP transport network. Such a framework can offer integrated QoS, along with allowing for an optimum use of transport resources. In certain example implementations, communication system 10 uses a policy push model that can be supported in PCMM to achieve E2E QoS. Further, although DOCSIS can readily be accommodated in example embodiments of the present disclosure, other access networks are more likely to support the push models of the present disclosure. From a broader perspective, communication system 10 accommodates any type of generic tunneling mechanism, including supporting CAPWAP solutions, as well as more classical LTE architectures.

Returning to FIG. 1, IP host 12 can be associated with clients or customers wishing to initiate a flow in communication system 10 via some network. IP host 12 is representative of (and therefore includes) any type of 'user equipment', 'endpoint', 'user', 'mobile node', 'end user', 'subscriber', etc. This would be inclusive of devices used to initiate a communication, such as a computer, a personal digital assistant (PDA), a laptop or electronic notebook, a cellular telephone, an i-Phone, i-Pad, a Google Droid phone, any type of smartphone, an IP phone, or any other device, component, element, or object capable of initiating voice, audio, video, media, or data exchanges within communication system 10. This could also be inclusive of a suitable interface to a user such as a microphone, a display, a keyboard, or other terminal equipment.

IP host 12 may also be associated with any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, users have a bundled subscription for network access and application services (e.g., voice), etc. Once the access session is established, the user can register for application services as well, without additional authentication requirements. There can be a single consolidated AAA instance, or two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

PCRF 26 is a network element responsible for coordinating charging and/or policy decisions for users. PCRF 26 can be configured to use subscription information as a basis for the policy and charging control decisions. The subscription information may apply for both session-based and non-session based services. PCRF 26 can maintain session linking to the sessions via policy interactions with PGWs and AF 30 (e.g., provided as part of the operator's IP services). AF 30 can be provided within PCRF 26 (or simply interact with PCRF 26) in order to offer applications that require dynamic policy and/or charging control. AF 30 can communicate with PCRF 26 to transfer dynamic session information. Additionally, any type of policy and/or charging control element (e.g., PCC infrastructure) can be provided within (or suitably interact with) PCRF 26.

AAA server 20 is a network element responsible for accounting, authorization, and authentication functions for users. For the AAA considerations, AAA server 20 may provide the mobile node IP address and the accounting session identification (Acct-Session-ID) and other mobile node states in appropriate messaging (e.g., via an access-Request/access-Accept message). An accounting message can be sent for the following events: accounting-start when the IP session is initially created for the mobile node on the gateway; accounting-interim-update when a handover occurred between gateways; and an accounting-stop when the IP session is removed from the gateway serving the element. For roaming scenarios, the home routed case is fully supported by the architecture.

In operation, AAA 20 offers a subscriber database in various access network (e.g., GSM, LTE, CDMA, etc.) environments. When a user moves, AAA 20 can be aware of the location and the anchor point. AAA server 20 can coordinate state information for users (and synchronize this information) to achieve mobility. No matter how a UE moves, the access network element can be interacting with AAA server 20 in order to identify which gateways should receive the appropriate signaling. The route to a UE can be consistently maintained, where the routing topology ensures that data is sent to the correct IP address. Thus, synchronization activity on the backend of the architecture allows mobility to be achieved for the user when operating in different environments.

RANs in an LTE architecture can consist of eNodeBs (also known as eNBs). An eNodeB is generally connected directly to an EPC, as well as to adjacent eNodeBs. Connections with adjacent eNodeBs allow many calls to be routed more directly, often with minimal or no interaction with an EPC. An eNodeB is also responsible for selecting an MME for UEs, managing radio resources, and making handover decisions for UEs.

An EPS bearer/E-UTRAN Radio Access Bearer (E-RAB) is the level of granularity for bearer level QoS control in the EPC/E-UTRAN. Thus, Service Data Flows (SDFs) mapped to the same EPS bearer can receive the same bearer level packet forwarding treatment (e.g. scheduling policy, queue management policy, rate shaping policy, RLC configuration, etc.). One EPS bearer/E-RAB can be established when the UE connects to a PDN. This bearer, which is generally referred to as the "default bearer," may remain established throughout the lifetime of the PDN connection to provide the UE with always-on IP connectivity to that PDN. Any additional EPS bearer/E-RAB that may be established to the same PDN is generally referred to as a "dedicated bearer." The initial bearer level QoS parameter values of the default bearer are assigned by the network, based on subscription data. The decision to establish or modify a dedicated bearer can be taken by the EPC, and the bearer level QoS parameter values may be assigned by the EPC.

Dedicated network resources related to a Guaranteed Bit Rate (GBR) value that is associated with the EPS bearer/E-RAB may be permanently allocated (e.g., by an admission control function in the eNodeB) at bearer establishment/modification. An EPS bearer/E-RAB having a GBR is generally referred to as a "GBR bearer." Otherwise, an EPS bearer/E-RAB is referred to as a "Non-GBR bearer." A dedicated bearer can be either a GBR or a Non-GBR bearer, but a default bearer is a Non-GBR bearer.

The bearer level QoS parameters may include a QoS Class Identifier (QCI), Allocation and Retention Priority (ARP), GBR, and Aggregate Maximum Bit Rate (AMBR). Each EPS bearer/E-RAB (GBR and Non-GBR) is generally associated with QCI and ARP parameters, while GBR bearers may additionally be associated with GBR. A QCI is generally a scalar used as a reference to access node-specific parameters that control bearer level packet forwarding treatment (e.g., scheduling weights, admission thresholds, queue management thresholds, link layer protocol configuration, etc.), and that have been pre-configured by the operator owning the eNodeB. In many embodiments, there are multiple unique classes of service that depend on packet delay budget. Voice and video are generally offered using a QCI of 1 or 2, for example. ARP may be used to decide whether a bearer establishment or modification request can be accepted or should be rejected because of resource limitations. ARP can also be used by the eNodeB to decide which bearer(s) to drop during exceptional resource limitations (e.g., at handover).

Network element 22 can include one or more functions to be performed for the system. For example, in certain embodiments, network element 22 is a router that includes capabilities for stateful packet inspection (SPI), deep packet inspection (DPI), and/or a PCEF. More generally, as used herein in this Specification, the term 'network element' is meant to encompass any of the aforementioned elements, as well as switches, cable boxes, endpoints, gateways, bridges, STBs, loadbalancers, firewalls, inline service nodes, proxies, servers, processors, modules, or any other suitable device, component, element, proprietary appliance, or object operable to exchange data in a network environment. These network elements may include any suitable hardware, software, components, modules, interfaces, or objects that facilitate the operations thereof. This may be inclusive of appropriate algorithms and communication protocols that allow for the effective exchange of data or information.

Figure 2:
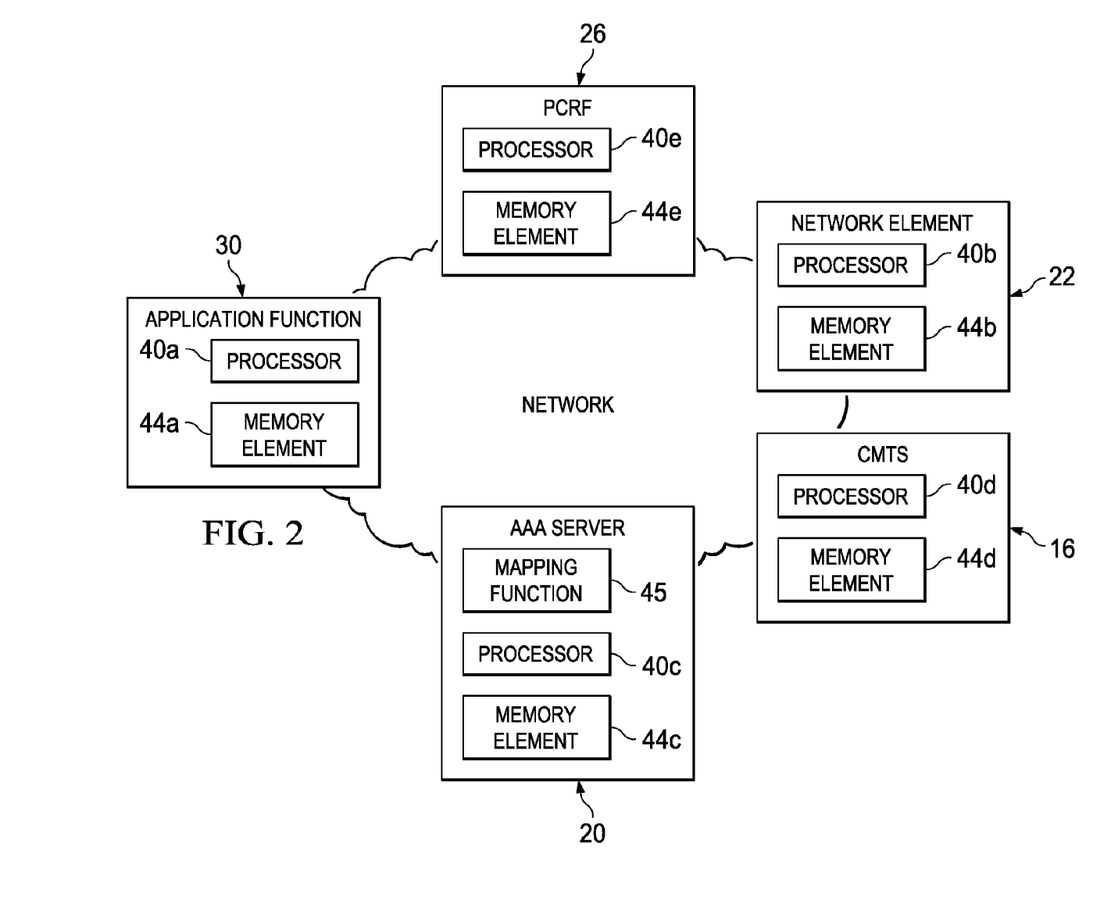
FIG. 2 is a simplified block diagram illustrating additional details that may be associated with one potential embodiment of the communication system.

Turning to FIG. 2, FIG. 2 is a simplified block diagram illustrating additional details that may be associated with one potential embodiment of communication system 10. FIG. 2 includes PCRF 26, AF 30, CMTS 16, network element 22, and AAA server 20. Each of these elements can include a respective processor 40a-e and a respective memory element 44a-e. Additionally, AAA server 20 includes a mapping function 45 that can perform operations to achieve the teachings of the present disclosure. Alternatively, this mapping function 45 may be provisioned in any other element of FIG. 2, or provisioned in any other logical location of the network.

Embodiments of communication system 10 are able to deliver E2E QoS in terms of coupling per host quality of service (otherwise delivered using traditional PCRF/PCEF capabilities) with a transport network that is enhanced to support dynamic QoS capabilities. More specifically, AAA server 20 is configured to map between a mobile host's IP address(es) and the corresponding tunnel addresses used to transport flows from the mobile host over an access network.

Essentially, a function can be provided to offer a dynamic mapping service for a particular framed IP address or prefix. The dynamic mapping function is able to provide a querying element with the tunnel transport addresses used. Furthermore, due to mobility events, the host may change the layer-1 point of attachment with the network. In such situations, the dynamic mapping function is able to provide an asynchronous indication to a previous querying element that the tunnel addresses have changed.

A dynamic mapping function is operable to be signaled from access gateway elements regarding the tunnel transport addresses used to support the flows from a framed IP address or prefix. In a preferred embodiment, RADIUS Interim messages can be used to provide this signaling. Alternatively, any other signaling mechanism may be used in such a context to achieve the teachings of the present disclosure. In a further embodiment, the signaling element may be a WLC, where the tunnel transport addresses are associated with a CAPWAP tunnel between a Wi-Fi AP and a WLC. In another embodiment, the signaling element is a 3GPP PGW, where the tunnel transport addresses are associated with the GTP tunnel between the SGW and the PGW. In another embodiment, the signaling element may be an SGW, where the tunnel transport addresses are associated with the GTP tunnel between the eNB and the SGW.

In operation of a particular example implementation, an enhanced policy function is provided that is operable to first query the dynamic mapping function to retrieve the tunnel transport addresses used to transport flows associated with a particular framed IP address. The enhanced policy function is operable to reconfigure any message received from an application function (e.g., including media component descriptions and maximum uplink/downlink (UL/DL)) bandwidths and translate such media descriptions to the transport addresses. The enhanced policy function is then operable to signal the access network using the translated information to establish the correct QoS resources in the transport network for supporting the tunneled traffic.

In one example embodiment, the enhanced policy server can use PCMM interfaces to ensure that QoS resources (in terms of dynamic service flows) are established on the DOCSIS IP transport network. The enhanced policy server is further operable to recover asynchronous signaling of updated transport IP addresses (e.g., triggered as the result of mobility events). The policy server can process such information (including the possible updating of the transport address mapping) and, further, signal the access network when previously allocated resources can be freed, and where newly allocated transport resources should be reserved for tunnel transport. Additional details associated with many of these activities are discussed below in the context of a number of flows being illustrated by FIGS. 3-5.

Figure 3:
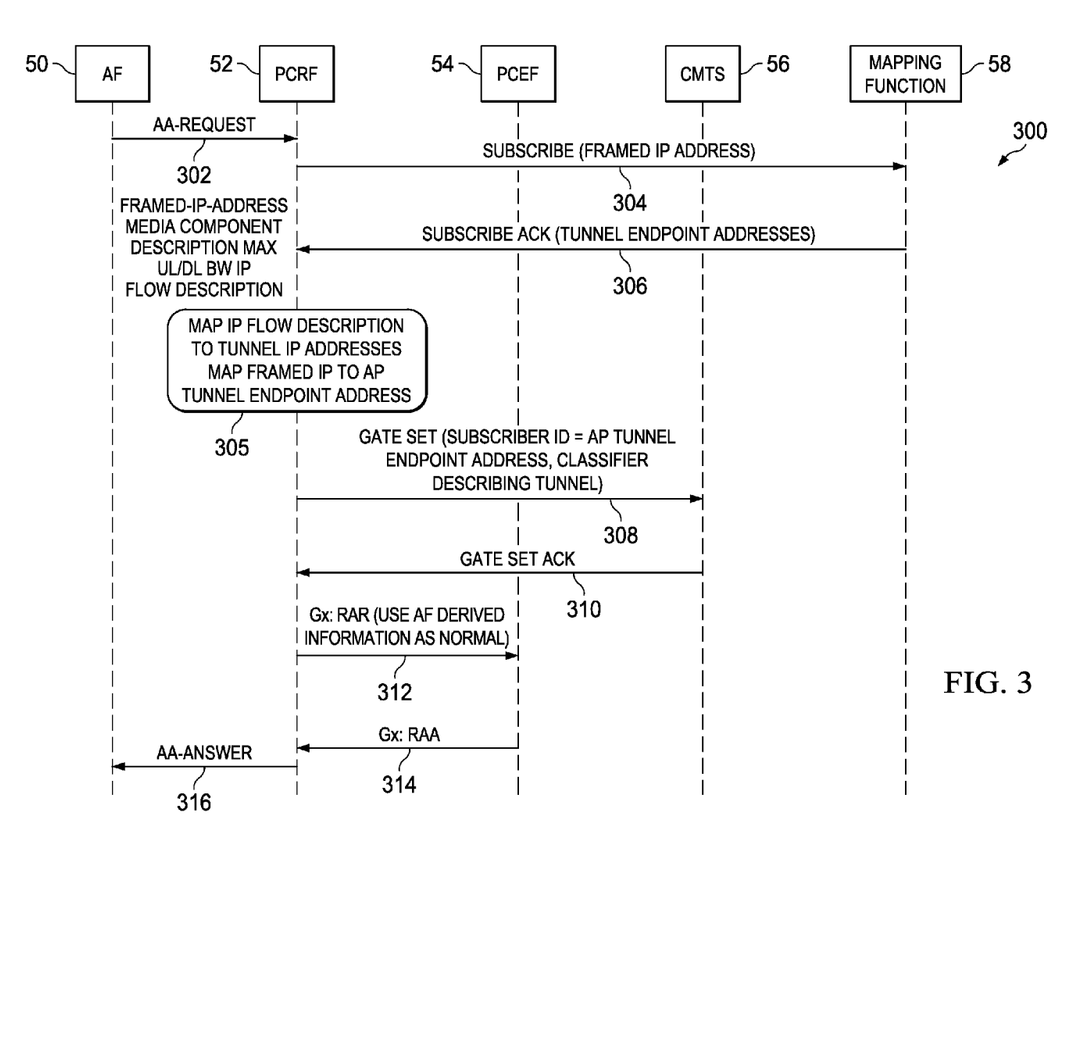
FIGS. 3-5 are simplified flow diagrams illustrating several flows associated with example activities of the communication system.

Turning to FIG. 3, FIG. 3 is a simplified flow diagram 300 illustrating example activities associated with the present disclosure. These particular activities involve an AF 50, a PCRF 52, a PCEF 54, a CMTS 56, and a mapping function 58, which can be provisioned in any suitable network element. At 302, an AA request is sent to PCRF 52, where PCRF 52 responds at 304 by sending a subscribe message to mapping function 58. At 306, a subscribe ACK is sent back to PCRF 52. A mapping occurs between an IP flow description to the tunnel IP addresses, along with a mapping of the framed IP to the AP tunnel endpoint address, as is being depicted by 305. At 308, a gate set message is sent to CMTS 56, which responds with a gate set ACK at 310. Interaction occurs at 312 and 314 between PCRF 52 and PCEF 54. The AA answer is provided back to AF 50 at 316.

Figure 4:
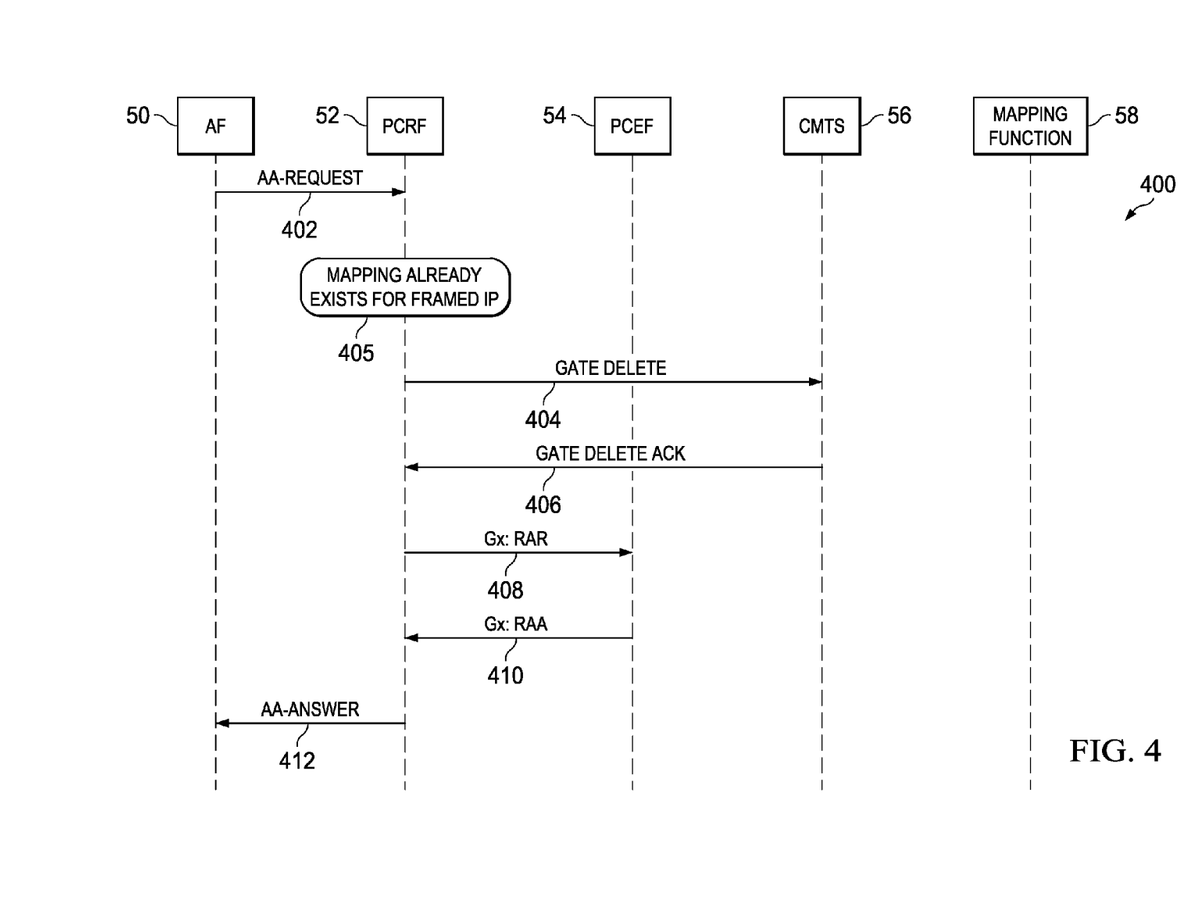

Referring now to FIG. 4, FIG. 4 is a simplified flow diagram 400 illustrating example activities associated with the present disclosure. This particular flow begins at 402 with an AA request. In this particular example, a mapping already exists for the framed IP, which is being depicted by 405. A gate delete message is sent at 404 to CMTS 56, which responds with a gate delete ACK message at 404. Interactions continue between PCEF 54 and PCRF 52 (as is shown at 408 and 410). The AA answer is provided back to AF 50, as is being shown by 412.

Figure 5:
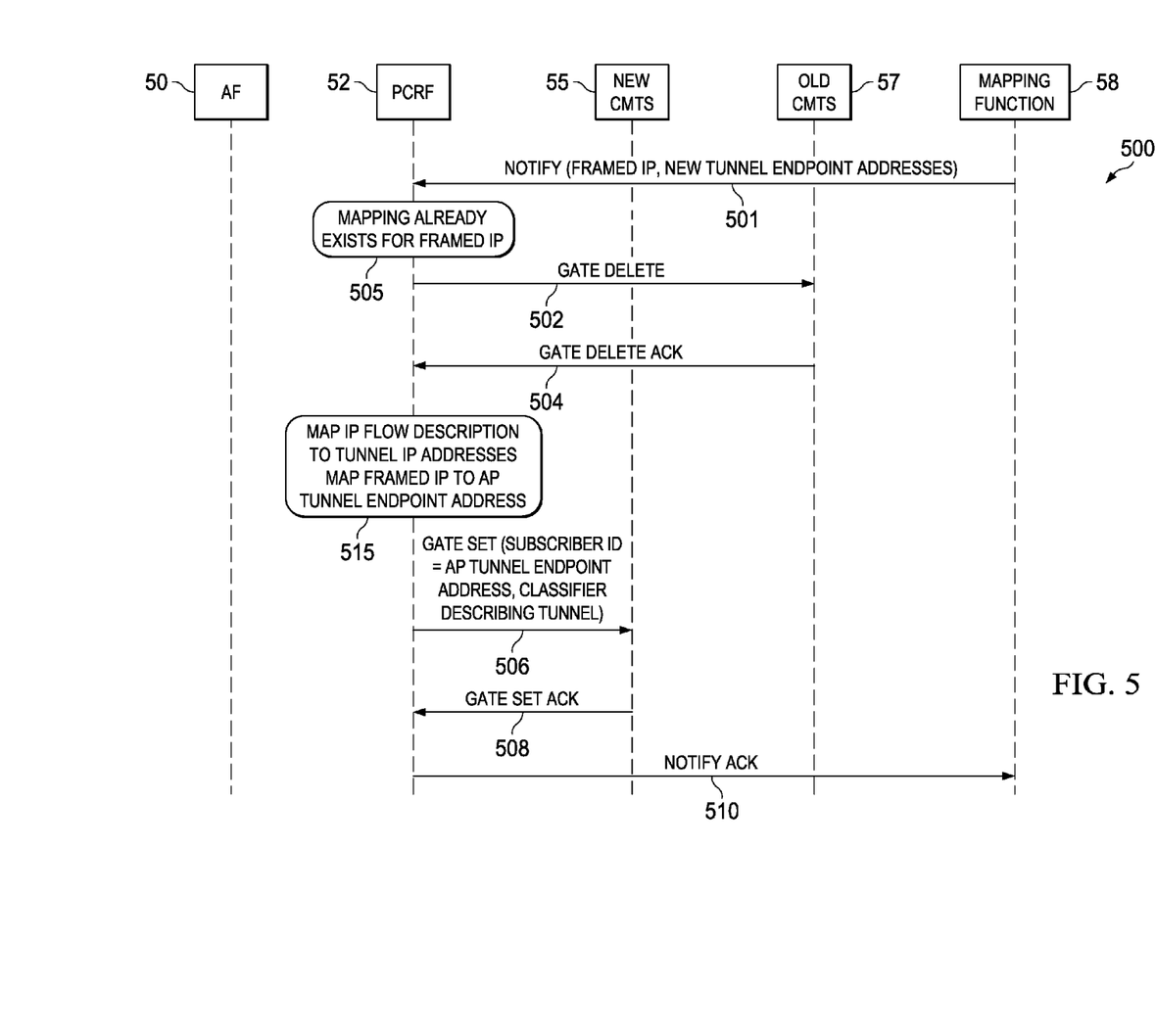

Turning to FIG. 5, FIG. 5 is a simplified flow diagram 500 illustrating example activities associated with the present disclosure. This particular example involves a new CMTS 55 and an old CMTS 57. The particular flow begins at 501, where a notification message is sent from mapping function 58 to PCRF 52. In this particular example, the mapping already exists for the framed IP, which is being shown by 505. At 502, a gate delete message is sent to old CMTS 57, which responds with a gate delete message ACK at 504. The IP flow description is mapped to the tunnel IP addresses, and the framed IP is mapped to the AP tunnel endpoint address: all of which is being depicted by 515. A gate set message is sent at 506 to new CMTS 55. At 508, a gate set ACK message is sent to PCRF 52. At 510, a notify ACK message is sent back to mapping function 58.

Note that with the examples provided above, as well as numerous other examples provided herein, interaction may be described in terms of two, three, or four network elements.

However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a function (e.g., mapping function 45) is provided within the network elements, such elements can be provided externally, or consolidated and/or combined in any suitable fashion. In certain instances, certain elements may be provided in a single proprietary module, device, unit, etc.

As identified previously, a network element (e.g., AAA server 20) can include software (e.g., mapping function 45) to achieve the QoS management operations, as outlined herein in this document. In certain example implementations, the QoS management functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor [e.g., processors provided in any of the components of FIGS. 1-2]).

In some of these instances, a memory element [e.g., provided in any of the components of FIGS. 1-2] can store data used for the operations described herein. This includes the memory element being able to store instructions (e.g., software, code, etc.) that are executed to carry out the activities described in this Specification. The processors can execute any type of instructions associated with the data to achieve the operations detailed herein in this Specification. In one example, the processor could transform an element or an article (e.g., data) from one state or thing to another state or thing. In another example, the QoS management activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Hence, any of these elements (e.g., the network elements of FIGS. 1-2, etc.) can include memory elements for storing information to be used in achieving the QoS management operations as outlined herein. Additionally, each of these devices may include a processor that can execute software or an algorithm to perform the QoS management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

While certain embodiments have been described herein in terms of a DOCSIS architecture or an LTE network, the principles illustrated are applicable generally to any wireless network that has any level of QoS enabled on a wireless link, including WiMAX and High Speed Packet Access (HSPA), for example. In general terms, the SGW generally represents the first point of un-tunneled IP traffic in a mobile network. In a WiMAX network, for instance, the SGW may be analogous to an Access Service Network Gateway (ASN-GW or AGW). The Agg-PE represents an aggregation node for the mobile backhaul network (e.g., links between the RAN and EPC), and may be terminating a wide range of interface types, such as Ethernet, Synchronous Optical Network (SONET) (OCx), microwave, etc. An eNodeB, as used herein, represents a radio or mobile node that provides the wireless carrier to subscribers. In WiMAX, for instance, an eNodeB may be represented as a base transceiver station (BTS). A cell site element represents any element that provides the routing, switching, and transport functions at the cell site, which may be integrated with or separate from an eNodeB.

Similarly, since communication system 10 may include a configuration capable of TCP/IP communications, existing IP-based mechanisms for signaling and enforcing QoS may also be used throughout the system. Thus, in a WiMAX radio access domain, for example, communication system 10 may use the R6 interface, which allows for signaling of QoS and policy information between an ASN-GW and a BTS. In the transport domain, communication system 10 may use other existing protocols, such as E-LMI and Y.1731 performance management functions, along with pending MEF-20 auto-provisioning functions, for example.

It is also important to note that the steps in the preceding FIGURES illustrate only some of the possible scenarios that may be executed by, or within, video system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by video system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving a request associated with a flow over a wireless link, wherein the request specifies resource requirements for the flow;
mapping an Internet protocol (IP) flow description to a plurality of tunnel IP addresses; and
mapping a framed IP address to an access point (AP) tunnel endpoint address in order to establish a quality of service (QoS) for tunneled traffic.

2. The method of claim 1, further comprising:
recovering asynchronous signaling of updated transport IP addresses as a result of at least one mobility event.

3. The method of claim 1, further comprising:
reconfiguring a message received from an application function in order to provide a mapping to the tunnel IP addresses.

4. The method of claim 3, wherein the message includes media component descriptions and uplink/downlink bandwidth data.

5. The method of claim 1, wherein the wireless link is coupled to a Data over Cable Service Interface Specification (DOCSIS) link associated with a cable modem and a cable modem termination system (CMTS).

6. The method of claim 5, wherein Packet Cable Multimedia (PCMM) interfaces are used to establish the QoS for a DOCSIS IP transport network.

7. The method of claim 1, wherein remote authentication dial in user service (RADIUS) protocol interim messages are used for signaling the tunnel IP addresses.

8. The method of claim 1, further comprising:
signaling an access network for previously allocated resources to be released; and
signaling the access network for newly allocated transport resources to be reserved for tunneled transport.

9. The method of claim 1, wherein the request includes a quality of service parameter corresponding to the resource requirements.

10. The method of claim 1, wherein the tunnel IP addresses are associated with a control and provisioning of wireless access points (CAPWAP) tunnel between a Wi-Fi access point (AP) and a wireless local area network controller (WLC).

11. The method of claim 1, wherein the tunnel IP addresses are associated with a GPRS Tunneling Protocol (GTP) tunnel between a service gateway (SGW) and a packet data network (PDN) gateway (PGW).

12. The method of claim 1, wherein the tunnel IP addresses are associated with a GPRS Tunneling Protocol (GTP) tunnel between an eNode B (eNodeB) and a service gateway (SGW).

13. The method of claim 1, wherein a layer-1 point of attachment (PoA) with an access network is changed as a result of at least one mobility event.

14. The method of claim 13, further comprising:
providing an asynchronous indication to a previous querying element that at least one of the tunnel IP addresses have changed as a result of the at least one mobility event.

15. A non-transitory media encoded with logic that includes code for execution and when executed by a processor operable to perform operations comprising:
receiving a request associated with a flow over a wireless link, wherein the request specifies resource requirements for the flow;
mapping an Internet protocol (IP) flow description to a plurality of tunnel IP addresses; and
mapping a framed IP address to an access point (AP) tunnel endpoint address in order to establish a quality of service (QoS) for tunneled traffic.

16. The non-transitory media of claim 15, the operations further comprising:
reconfiguring a message received from an application function in order to provide a mapping to the tunnel IP addresses, wherein the message includes media component descriptions and uplink/downlink bandwidth data.

17. The non-transitory media of claim 15, wherein the wireless link is coupled to a Data over Cable Service Interface Specification (DOCSIS) link associated with a cable modem and a cable modem termination system (CMTS).

18. An apparatus, comprising:
a memory element configured to store electronic code;
a processor operable to execute instructions associated with the electronic code; and
a mapping function configured to interface with the processor such that the apparatus is configured to:
receive a request associated with a flow over a wireless link, wherein the request specifies resource requirements for the flow;
map an Internet protocol (IP) flow description to a plurality of tunnel IP addresses; and
map a framed IP address to an access point (AP) tunnel endpoint address in order to establish a quality of service (QoS) for tunneled traffic.

19. The apparatus of claim 18, the apparatus being further configured to:
reconfigure a message received from an application function in order to provide a mapping to the tunnel IP addresses, wherein the message includes media component descriptions and uplink/downlink bandwidth data.

20. The apparatus of claim 18, wherein the wireless link is coupled to a Data over Cable Service Interface Specification (DOCSIS) link associated with a cable modem and a cable modem termination system (CMTS).

21. The apparatus of claim 18, wherein the wireless link is associated with a selected one of a group of transport networks, the group consisting of:
a) a control and provisioning of wireless access points (CAPWAP) network;
b) a DOCSIS network; and
c) a Telecoms & Internet converged Services & Protocols for Advanced Networks (TISPAN) network.

* * * * *